United States Patent [19]
Yasuda et al.

[11] Patent Number: 4,616,692
[45] Date of Patent: Oct. 14, 1986

[54] METHOD OF RECOVERING HEAT OF REACTION

[75] Inventors: Kenji Yasuda, Amagasaki; Tsutomu Nakamura, Osaka; Shinichi Tomita, Toyonaka, all of Japan

[73] Assignee: Hitachi Zosen Corporation, Osaka, Japan

[21] Appl. No.: 743,135

[22] Filed: Jun. 10, 1985

[30] Foreign Application Priority Data

Jun. 12, 1984 [JP] Japan ................. 59-121112

[51] Int. Cl.$^4$ .................. F28D 21/00; F25B 15/00
[52] U.S. Cl. .................. 165/1; 165/104.12; 62/480
[58] Field of Search ............ 165/104.12, 1; 62/480

[56] References Cited

U.S. PATENT DOCUMENTS 4,055,962  11/1977  Terry ..................... 165/104.12
4,523,635   6/1985  Nishizaki et al. ......... 165/104.12

Primary Examiner—Albert W. Davis, Jr.
Attorney, Agent, or Firm—Armstrong, Nikaido, Marmelstein & Kubovcik

[57] ABSTRACT

A method of recovering the heat of reaction for use in chemical heat storage or chemical heat pump systems wherein 2 moles of water vapor is reacted with 1 mole of calcium bromide anhydride to make use of the heat of hydration evolved. The method is characterized by producing water vapor at a high temperature level by heating water in an evaporator with use of the heat of hydration evolved by the hydration reaction of calcium bromide monohydrate into calcium bromide dihydrate in a first reactor included in a plurality of reactors, and supplying the resulting water vapor to a second reactor included in the reactors as water vapor for the hydration reaction of the monohydrate into the dihydrate. The method gives heat substantially at the same high temperature level as the heat of hydration of the anhydride into the monohydrate.

2 Claims, 5 Drawing Figures

METHOD OF RECOVERING HEAT OF REACTION

BACKGROUND OF THE INVENTION

The present invention relates to a chemical heat storage system or chemical heat pump system wherein the heat of hydration reaction of calcium bromide is utilized, and more particularly to a method of recovering the heat of reaction for use in the system.

First, a description will be given of the basic principle of chemical heat storage or chemical heat pumps conventionally practiced or employed with use of $CaBr_2 \cdot 2H_2O$.

FIG. 1 is a graph showing the saturated water vapor pressure of $CaBr_2 \cdot 2H_2O$ and $CaBr_2 \cdot H_2O$ and the saturated water vapor pressure of liquid water measured by the present inventors.

When $CaBr_2 \cdot 2H_2O$ is heated to 200° C. by a high-temperature heat source, a dehydration reaction occurs as represented by the following equation.

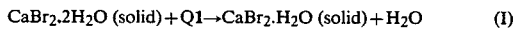
$$CaBr_2 \cdot 2H_2O \text{ (solid)} + Q1 \rightarrow CaBr_2 \cdot H_2O \text{ (solid)} + H_2O \quad \text{(I)}$$

wherein heat Q1 is 15.0 kcal/$CaBr_2$ mol.

Thus, $CaBr_2 \cdot 2H_2O$ releases water vapor, giving 1 mol of $CaBr_2 \cdot H_2O$ and 1 mol of water vapor. The water vapor exhibits a pressure of 420 mm Hg as indicated at a in FIG. 1. This water vapor pressure is equal to the saturated water vapor pressure of water at 86° C. as indicated at f in the diagram. When cooled to 20° C., the water vapor condenses to water of 20° C. according to the following equation, evolving heat of condensation as latent heat Q3 because the vapor pressure of water at 20° C. is 16 mm Hg as indicated at b in the diagram.

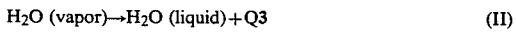
$$H_2O \text{ (vapor)} \rightarrow H_2O \text{ (liquid)} + Q3 \quad \text{(II)}$$

wherein Q3 is 10.5 kcal/$H_2O$ mol.

When the above procedure is continued after the completion of the dehydration reaction of Eq. (I), $CaBr_2 \cdot H_2O$ undergoes a dehydration reaction according to the following equation since the water vapor pressure of $CaBr_2 \cdot H_2O$ is 130 mm Hg as indicated at c in FIG. 1 and is higher than the vapor pressure, 16 mm Hg, of water at 20° C.

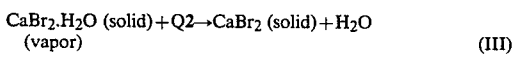
$$CaBr_2 \cdot H_2O \text{ (solid)} + Q2 \rightarrow CaBr_2 \text{ (solid)} + H_2O \text{ (vapor)} \quad \text{(III)}$$

where Q2 is 17.0 kcal/$CaBr_2$ mol.

The dehydration reaction comes to an end when 17.0 kcal/$CaBr_2$ mole of the heat Q2 has been given.

FIG. 4 collectively schematically shows the foregoing relationship.

In the above process, the temperature of the high-temperature heat source is 200° C. and that of the low-temperture heat source is 20° C., but the temperature of the high-temperature heat source need not be 200° C. With reference to the water vapor pressure curves of $CaBr_2 \cdot H_2O$ and $CaBr_2 \cdot 2H_2O$, the dehydration reactions of Eq. (I) and Eq. (III) take place when the temperature is higher than the temperatures corresponding to the vapor pressure (16 mm Hg in the present case) of the condensation water at the temperature of the low-temperature heat source, i.e. higher than 122° C. indicated at e in FIG. 1 for the conversion of $CaBr_2 \cdot 2H_2O$ to $CaBr_2 \cdot H_2O$ and higher than 156° C. indicated at d in FIG. 1 for the further conversion to the anhydride of calcium bromide. Furthermore, the temperature of the low-temperature heat source need not be 20° C. The dehydration reactions of Eq. (I) and (III) take place if the temperature is lower than the tempertures corresponding to the vapor pressures of water which are equal to the saturated water vapor pressures of $CaBr_2 \cdot 2H_2O$ and $CaBr_2 \cdot H_2O$ at the temperature (200° C. in this case) of the high-temperature heat source, i.e. lower than 86° C. and 60° C., respectively, as indicated at f and g in FIG. 1.

In this way, the anhydride of calcium bromide is regenerated when the dehydration reaction of $CaBr_2 \cdot 2H_2O$ is utilized for chemical heat storage or chemical heat pumps.

The heat recovery process is the reverse of the reactions (I) and (III). It is a process for hydrating the anhydride of calcium bromide according to Eq. (VI) and (V) given below.

First, according to the following equation

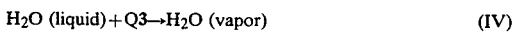
$$H_2O \text{ (liquid)} + Q3 \rightarrow H_2O \text{ (vapor)} \quad \text{(IV)}$$

heat of evaporation Q3 (=10.5 kcal/$H_2O$ mol) is given to water at 20° C. to produce water vapor having a low pressure of 16 mm Hg as indicated at b in FIG. 1.

$CaBr_2$ is exposed to the water vapor obtained to cause a hydration reaction according to the following equation.

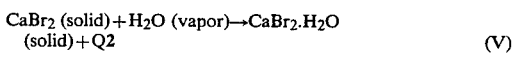
$$CaBr_2 \text{ (solid)} + H_2O \text{ (vapor)} \rightarrow CaBr_2 \cdot H_2O \text{ (solid)} + Q2 \quad \text{(V)}$$

The hydration reaction evolves heat of hydration Q2 (=17.0 kcal/$CaBr_2$ mol). The highest temperature obtained at this time is 156° C. as indicated at d in FIG. 1.

When the $CaBr_2 \cdot H_2O$ is further exposed to water vapor with a pressure of 16 mm Hg after the completion of the hydration reaction of Eq. (V), a hydration reaction takes place according to the following equation, developing heat of hydration Q1 (=15.0 kcal/$CaBr_2$ mol)

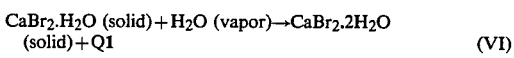
$$CaBr_2 \cdot H_2O \text{ (solid)} + H_2O \text{ (vapor)} \rightarrow CaBr_2 \cdot 2H_2O \text{ (solid)} + Q1 \quad \text{(VI)}$$

The highest temperature obtained at this time is 122° C. as indicated at e in FIG. 1.

FIG. 5 collectively schematically shows this heat recovery process.

Assuming that the foregoing regeneration process and heat recovery process are practiced at an ambient temperature of 20° C. with no thermal input to or output from the environment, the heat balance is as follows.

Amount of heat supplied:

Heat Q2 of 156° C. = 17.0 kcal/$CaBr_2$ mol

Heat Q1 of 122° C. = 15.0 kcal/$CaBr_2$ mol

Amount of heat recovered:

Heat $Q2'$ of 156° C. = 17.0 kcal/$CaBr_2$ mol

Heat $Q1'$ of 122° C. = 15.0 kcal/$CaBr_2$ mol $Q_{Hmax} =$

-continued $$\frac{\text{Amount of heat of high temperature recovered}}{\text{Amount of heat of high temperature supplied}} = \frac{Q2'}{Q2} = 1$$

Generally in chemical heat storage or chemical heat pump systems, the higher the temperature level of the heat recovered, the higher is the value of the heat for use as thermal energy. Accordingly, it is required that the heat to be recovered in such systems have the highest possible temperature.

The main object of the present invention which has been accomplished to fulfill the above requirement is to provide a reaction heat recovery method by which heat energy can be easily obtained at a high temperature level with a high value for use.

SUMMARY OF THE INVENTION

The invention provides a method of recovering the heat of reaction for chemical heat storage or chemical heat pump systems wherein 2 mols of water vapor is reacted with 1 mole of calcium bromide anhydride to utilize the heat of hydration evolved. The method is characterized by producing water vapor at a high temperature level by heating water in an evaporator with use of the heat of hydration evolved by the hydration reaction of calcium bromide monohydrate into calcium bromide dihydrate in a first reactor included in a plurality of reactors, and supplying the resulting water vapor to a second reactor included in the reactors as water vapor for the hydration reaction of the monohydrate into the dihydrate. The method gives heat substantially at the same high temperature level as the heat of hydration of the anhydride into the monohydrate.

DETAILED DESCRIPTION OF THE INVENTION

According to the preferred mode of practicing the present invention, the mol number of calcium bromide monohydrate in a first reactor, the mol number of calcium bromide monohydrate in a second reactor and the mol number of water in an evaporator is preferably in the ratio of 1:1:1.

Figure 1:
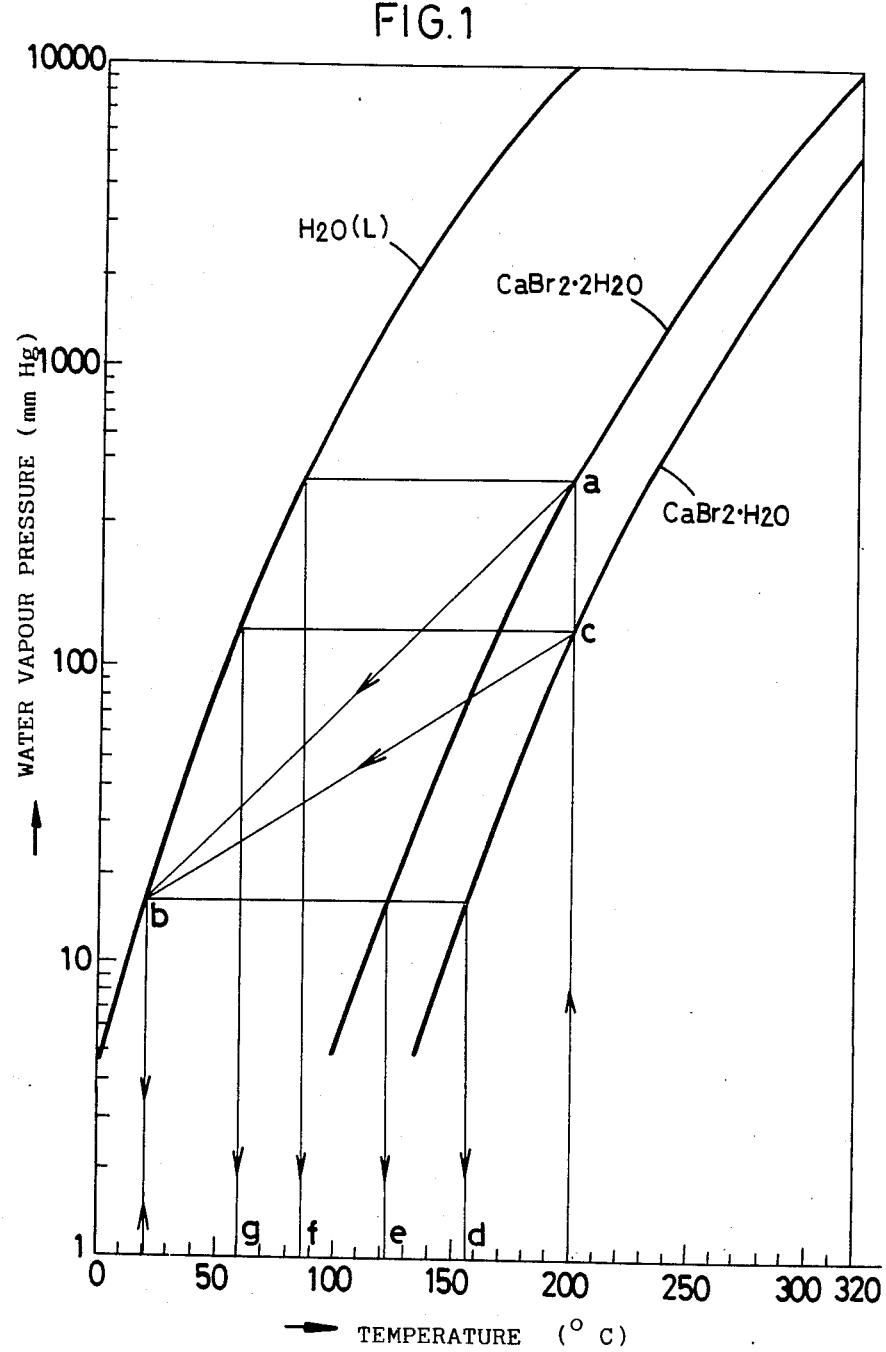
FIG. 1 and FIG. 3 are graphs showing water vapor pressure curves.
Figure 2:
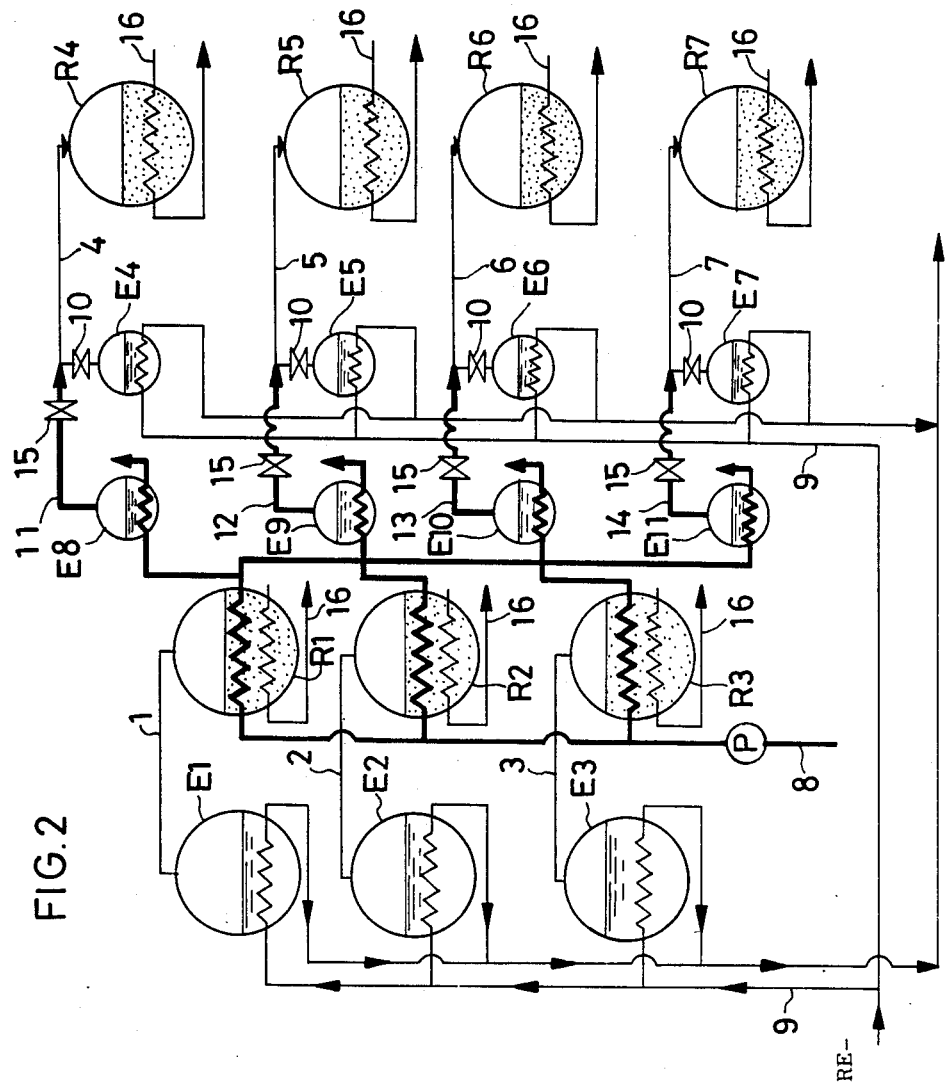
FIG. 2 is a flow chart showing a method of recovering the heat of reaction according to the present invention.

FIG. 2 shows an example of method of recovering the heat of reaction according to the invention.

First reactors R1 to R3 and second reactors R4 to R7 for the hydration and dehydration reactions of calcium bromide are in communication with first evaporators E1 to E3 and second evaporators E4 to E7, respectively, through water vapor lines 1 to 7. A low-temperature heat medium line 9 has a plurality of heat transfer portions which are provided within the first and second evaporators E1 to E7, respectively. Of the water vapor lines 1 to 7, the lines 4 to 7 communicating with the second reactors R4 to R7 each have a shut-off valve 10. Water vapor lines 11 to 14 extending from third evaporators E8 to E11 are connected to the water vapor lines 4 to 7, respectively, between the valves 10 and the second reactors R4 to R7. These water vapor lines 11 to 14 are also each provided with a shut-off valve 15. A heating heat medium line 8 have a plurality of heat transfer portions which are positioned within the first reactors R1 to R3 and within the third evaporators E8 to E11. The main flow portion of the line 8 has a pump P for heat medium circulation. A heat recovery line 16 has a plurality of heat transfer portions which are disposed in the first and second reactors R1 to R7.

With the apparatus of the above construction, the first and second reactors R1 to R7 have accommodated therein 1 mol of calcium bromide anhydride regenerated by dehydration. (The regeneration process is the same as the conventional process described and will not be described.) The first evaporators E1, E2 and E3 contain 2 mols of process water. Furthermore, the second evaporators E4 to E7 and the third evaporators E8 to E11 contain 1 mol of process water.

Now, the shut-off valves 10 are open, and the shut-off valves 15 are closed. When a low-temperature heat source medium at 20° C. is passed through the line 9 to give an amount of latent heat for evaporating 1 mol of process water, the medium heats the process water to produce water vapor. When the water vapor is introduced into the first and second reactors R1 to R7, the hydration reaction of Eq. (V) evolves heat of hydration, and heat of the highest temperature of 156° C. is recovered by a medium passed through the heat recovery line 16. The total amount of heat $Q_T$ obtained is as follows.

$$Q_T = 17.0 \times 7 = 119 \text{ (kcal)}$$

At this time, the process water within the second evaporators E4 to E7 has entirely evaporated, and the process water within the first evaporators E1 to E3 has reduced to one half of the initial amount. The calcium bromide anhydride within the first and second reactors R1 to R7 been converted to calcium bromide monohydrate by the hydration reaction with the water vapor.

Figure 3:
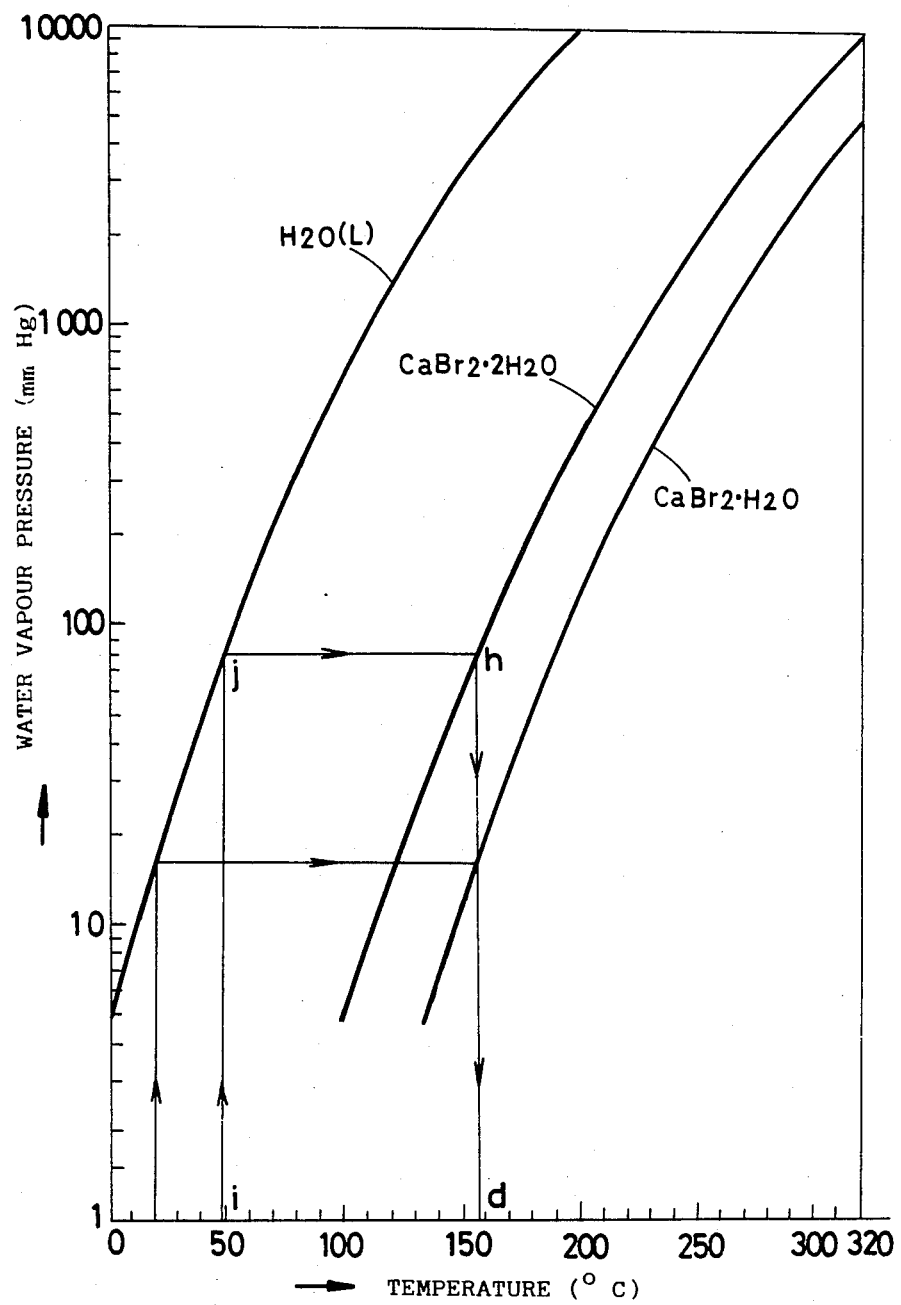
Figure 4:
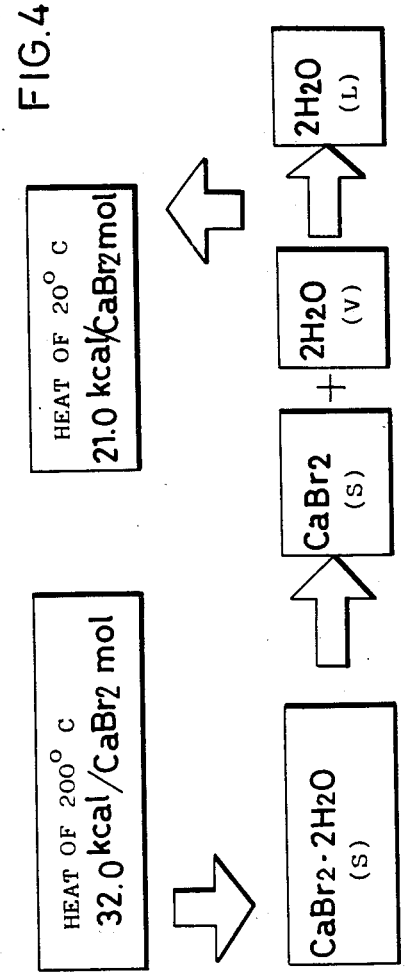
FIG. 4 and FIG. 5 are diagrams each showing heat balance.
Figure 5:
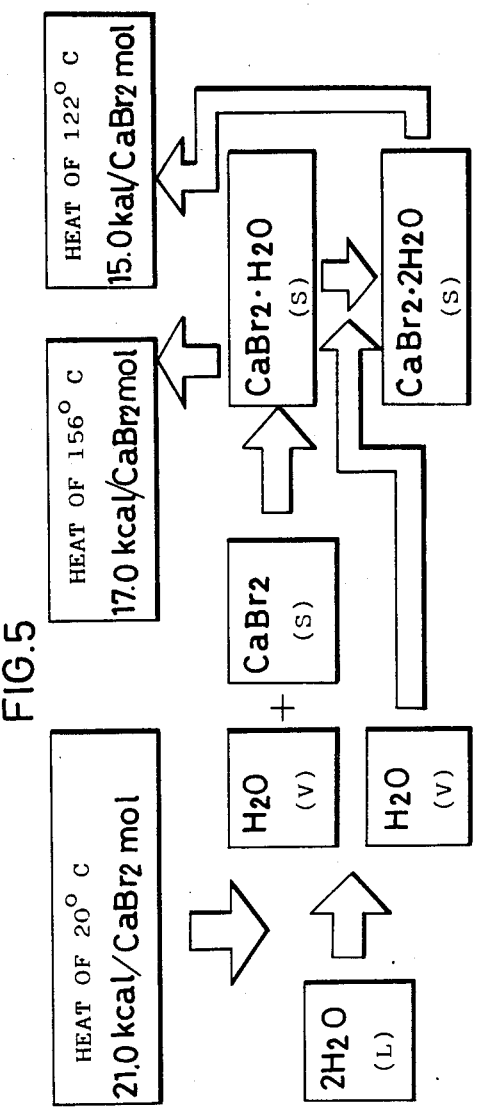

The saturated water vapor pressure of calcium bromide dihydrate at a temperature of 156° C. is 80 mm Hg as indicated at h in FIG. 3 and is equal to the vapor pressure of the process water at 48° C. Accordingly, when the vapor resulting from the evaporation of water and having a temperature of above 48° C. is supplied to the calcium bromide monohydrate, the monohydrate is hydrated to calcium bromide dihydrate, whereby heat of hydration of a temperature of 156° C. will be recovered.

One mol of process water remains in the first evaporators E1 to E3, so that when the low-temperature heat source medium of 20° C. is further supplied to the line 9, the hydration reaction of Eq. (VI) occurs, evolving heat of the highest temperature of 122° C. and giving a total amount of heat $Q_T' = 15.0 \times 3 = 45.0$ (kcal).

Next, the shut-off valves 10 are closed, the valves 15 are opened, and the pump P is operated. The heating heat medium supplied to the line 8 flows through the heat transfer portions within the first reactors R1 to R3 and then through the heat transfer portions within the third evaporators E8 to E11. Consequently, the medium absorbs the heat of hydration $Q_T'$ in the first reactors R1 to R3 and heats the process water within the third evaporators E8 to E11 with the heat obtained.

The temperature of the process water within the third evaporators E8 to E11 rises from 20° C. to 50° C. The rise of temperature requires sensible heat and heat of evaporation $Q_T''$ as follows.

$$Q_T'' = 4 \times \{(50-20) \times 0.018 + 10.5\} = 44.2 \text{ kcal}$$

wherein it is assumed that the specific heat of water is 0.018 kcal/mol.°C.

The amount of heat $Q_T''$ (=44.2 kcal) is approximately equal to $Q_T'$ (=45.0 kcal) previously obtained. Thus, the above supply of heat provides the amount of heat needed for evaporating the process water at above 48° C. within the second evaporators E4 to E7. Within the second reactors R4 to R7, therefore, the hydration reaction of Eq. (VI) further takes place as shown by arrows i→j→h→d in FIG. 3, and heat of hydration of the highest temperature of 156° C. is evolved in each reactor in an amount of 15.0 kcal/CaBr$_2$.2H$_2$O mol.

The total amount of heat Qs obtained is as follows.

$$Qs = 15.0 \times 4 = 60 \text{ kcal}$$

In the reaction heat recovery method described, it is assumed that the ambient temperature is 20° C. with no thermal input to or output from the environment. The heat balance is then as follows.

Amount of heat supplied:

Heat Q2 of 156° × 7 units = 119 kcal.

Heat Q1 of 122° C. × 7 units = 105 kcal

Amount of heat recovered:

Heat $Q_T$ of 156° C. + $Qs$ = 119 + 60 = 179 kcal $Q_{HMAX} =$ $$\frac{\text{Amount of heat of high temperature recovered}}{\text{Amount of heat of high temperature supplied}} =$$

-continued $$\frac{179 \text{ kcal}}{119 \text{ kcal}} = 1.50$$

The conventional recovery method described gives the heat of hydration of 122° C. of 15.0 kcal/CaBr$_2$ mol through the hydration of calcium bromide monohydrate, while the process of the invention provides the heat of 8.6 kcal/CaBr$_2$ mol at a high temperature level of 156° C. corresponding to the heat of hydration obtained by the hydration of calcium bromide anydride to monohydrate. Accordingly, the heat recovery efficiency at the high temperature level is about 1.5 times the efficiency heretofore achieved.

What is claimed is:

1. In a chemical heat storage or chemical heat pump system wherein 2 moles of water vapor is reacted with 1 mole of calcium bromide anhydride to utilize the heat of hydration evolved, a method of recovering the heat of reaction characterized by producing water vapor at a high temperature level by heating water in an evaporator with use of the heat of hydration evolved by the hydration reaction of calcium bromide monohydrate into calcium bromide dihydrate in a first reactor included in a plurality of reactors, and supplying the resulting water vapor to a second reactor included in the reactors as water vapor for the hydration reaction of the monohydrate into the dihydrate, whereby heat is obtained substantially at the same high temperature level as the heat of hydration of the anydride into the monohydrate.

2. A method as defined in claim 1 wherein the mol number of calcium bromide monohydrate in the first reactor, the mol number of calcium bromide monohydrate in the second reactor and the mol number of water in the evaporator is substantially in the ratio of 1:1:1.

* * * * *